(12) United States Patent
Lefebvre et al.

(10) Patent No.: US 11,702,946 B1
(45) Date of Patent: Jul. 18, 2023

(54) SERVICE TUBE LOCKING DEVICE

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/812,267

(22) Filed: Jul. 13, 2022

(51) Int. Cl.
*F01D 9/06* (2006.01)
*F01D 25/18* (2006.01)
*F01D 25/28* (2006.01)

(52) U.S. Cl.
CPC ............ *F01D 9/065* (2013.01); *F01D 25/18* (2013.01); *F01D 25/28* (2013.01); *F05D 2220/323* (2013.01); *F05D 2260/31* (2013.01); *F05D 2260/38* (2013.01); *F05D 2260/98* (2013.01)

(58) Field of Classification Search
CPC .. F01D 9/065; F05D 2260/31; F05D 2260/38; F05D 2220/323; F05D 2260/98; F01M 11/02; F16L 33/00; F16L 15/08; F16N 21/00; F16B 39/10
USPC ............ 285/92, 205–208; 411/122–124, 166
See application file for complete search history.

(56) References Cited

U.S. PATENT DOCUMENTS

| | | | |
|---|---|---|---|
| 3,469,852 A | 9/1969 | Smith et al. | |
| 5,335,490 A * | 8/1994 | Johnson | F23R 3/20 60/764 |
| 5,782,576 A | 7/1998 | Schlemenat et al. | |
| 6,199,453 B1 | 8/2001 | Steinbock | |
| 10,087,847 B2 | 10/2018 | Szymanski | |
| 10,385,710 B2 | 8/2019 | Hendrickson | |
| 10,557,376 B2 * | 2/2020 | Bouiller | F01D 9/065 |
| 11,041,438 B2 | 6/2021 | Agara et al. | |
| 2016/0041356 A1 | 2/2016 | Wang et al. | |
| 2018/0224043 A1 | 8/2018 | Hendrickson | |
| 2018/0333812 A1 | 11/2018 | Miller et al. | |
| 2020/0248455 A1 | 8/2020 | Chich et al. | |

FOREIGN PATENT DOCUMENTS

| | | | | |
|---|---|---|---|---|
| DE | 102004038525 A1 * | 2/2006 | ............ | F01M 11/02 |
| DE | 102008048261 B4 * | 4/2017 | ........... | F01D 5/3038 |

* cited by examiner

*Primary Examiner* — Brian P Wolcott
*Assistant Examiner* — Jesse M Prager
(74) *Attorney, Agent, or Firm* — Norton Rose Fulbright Canada LLP

(57) ABSTRACT

A service tube assembly for an aircraft engine, comprising: a service tube having a threaded end portion, an opposed end portion and an annular tube surface proximate to the threaded end portion; a housing having an outer surface defining a tube socket extending in the outer surface, and a ramp extending toward the tube socket so as to define an engagement direction, the tube socket engaged with the threaded end portion of the service tube; a locking member having a bottom surface disposed against the ramp and an engagement surface facing toward the service tube, the locking member slidable along the ramp in the engagement direction between a first member position in which the engagement surface is spaced from the annular tube surface and a second member position in which the engagement surface contacts the annular tube surface; and a fastener releasably holding the locking member against the ramp.

20 Claims, 5 Drawing Sheets

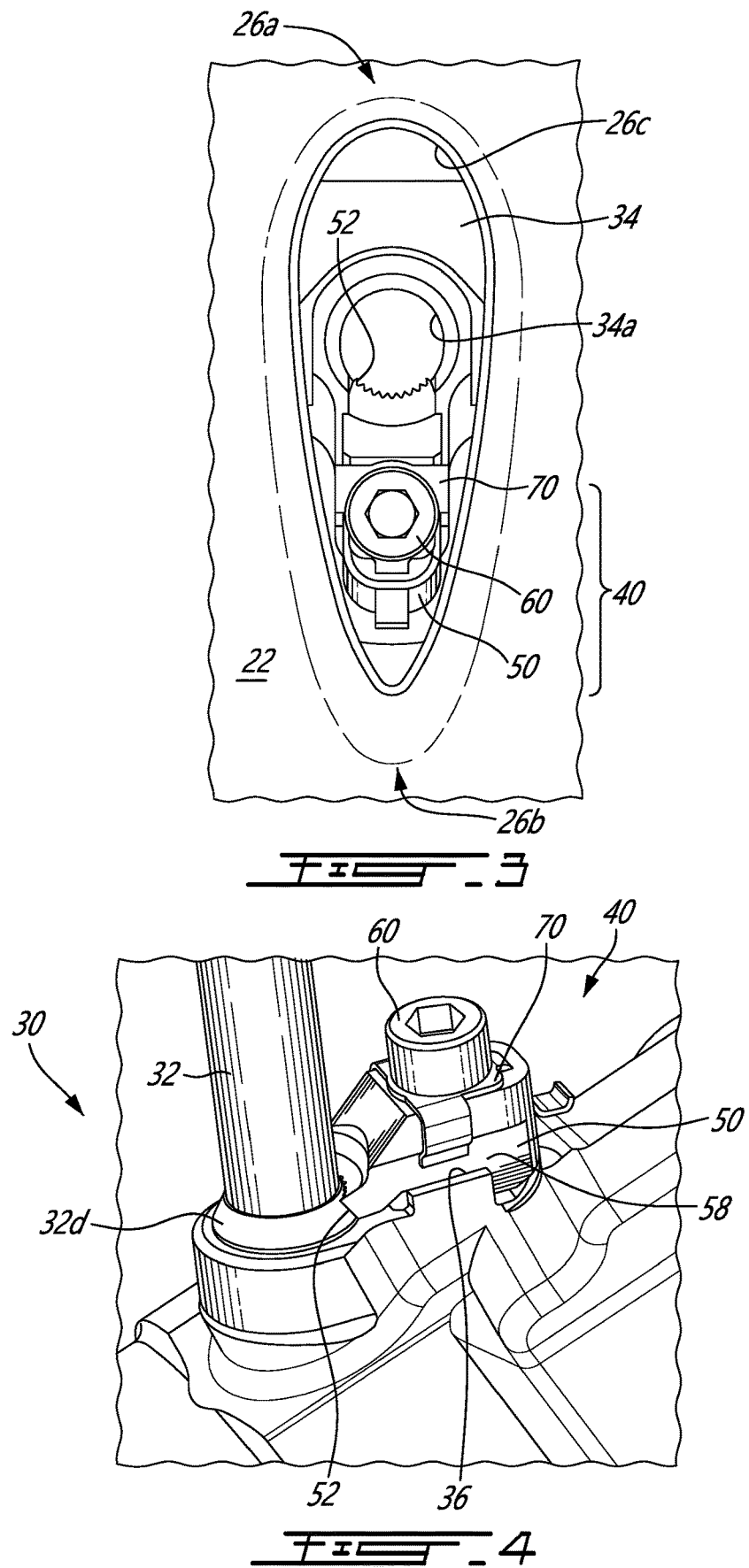

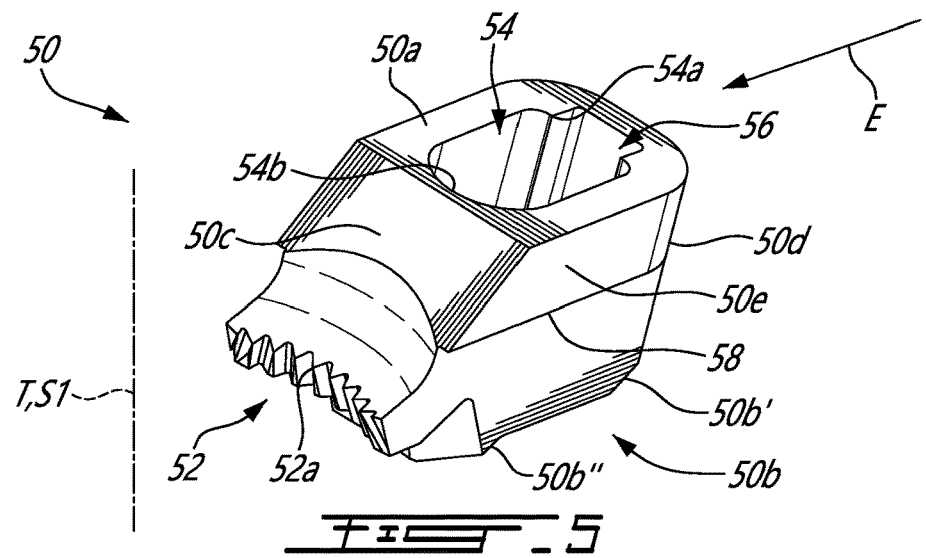
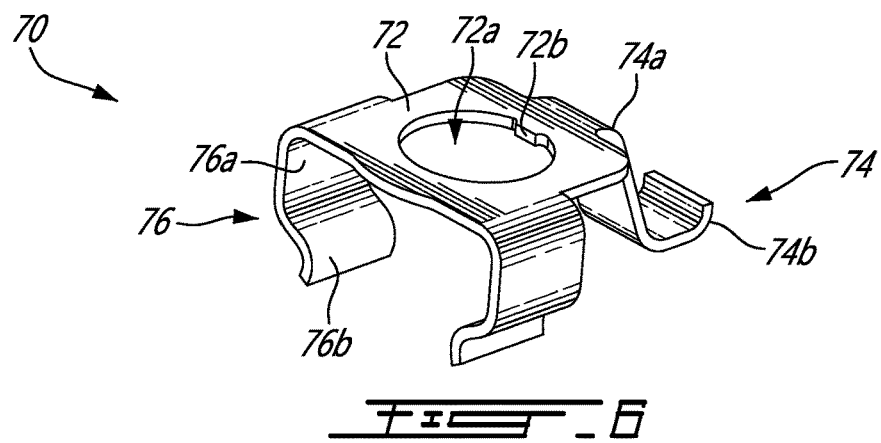
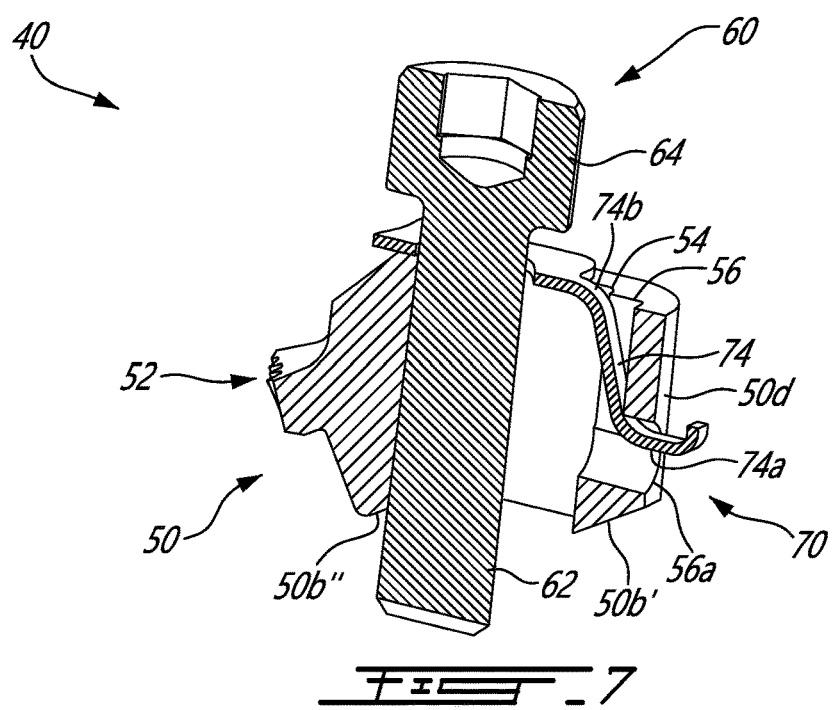

SERVICE TUBE LOCKING DEVICE

TECHNICAL FIELD

The application relates generally to service tubes and, more particularly, to service tube assemblies.

BACKGROUND

Turbine engines include various pipes or tubes therein for directing air, fuel, oil or mixtures thereof to engine components. Threaded connections are often used between such tubes and the associated engine components. However, threaded connections are susceptible to loosening after assembly due to various factors, such as vibrations, impacts, or alternating thermal loads to name a few.

SUMMARY

In accordance with an aspect of the present disclosure, there is provided a service tube assembly for an aircraft engine, comprising: a service tube having a threaded end portion, an opposed end portion and an annular tube surface proximate to the threaded end portion; a housing having an outer housing surface defining a tube socket extending in the outer housing surface, and a ramp extending toward the tube socket so as to define an engagement direction, the tube socket threadably engaged with the threaded end portion of the service tube; a locking member having a bottom member surface disposed against the ramp and an engagement member surface facing toward the service tube, the locking member slidable along the ramp in the engagement direction between a first member position in which the engagement member surface is spaced from the annular tube surface and a second member position in which the engagement member surface contacts the annular tube surface; and a mechanical fastener releasably holding the locking member against the ramp.

In accordance with another aspect of the present disclosure, there is provided a turbine exhaust case comprising: an outer duct wall and an inner duct wall defining therebetween an annular gas path about an engine axis; a strut extending across the annular gas path; a service tube extending through the strut, the service tube having a threaded end portion and an annular tube surface spaced from the threaded end portion; a housing disposed radially inwardly from the inner duct wall, the housing having a tube socket, the threaded end portion of the service tube threadably engaged with the tube socket, the housing further having a ramp located next to the tube socket; a locking assembly including a locking member and a mechanical fastener slidably received by the locking member, the locking member fastenable to the housing via the mechanical fastener, the locking member slidable along the ramp upon being fastened to the housing from a first member position spaced from the annular tube surface to a second member position against the annular tube surface.

BRIEF DESCRIPTION OF THE DRAWINGS

Reference is now made to the accompanying figures in which:

FIG. 3 is a close-up view of a service tube assembly of the turbine exhaust case of FIG. 2 shown from across a hollow strut of the turbine exhaust case, with a service tube removed from a remainder of the service tube assembly;

FIG. 4 is an isometric view of the service tube assembly of FIG. 3;

FIG. 5 is a perspective view of a locking member of the service tube assembly of FIG. 3;

FIG. 6 is a perspective view of a link of the service tube assembly of FIG. 3;

FIG. 7 is a cross-section view of a locking assembly of the service tube assembly of FIG. 3;

DETAILED DESCRIPTION

The description is generally directed to systems, methods, and other devices related to routing fluid flow (e.g., air, oil, fuel or mixtures thereof) in an engine and, more particularly, to systems, methods and devices for securing a threaded connection between a service tube and an associated engine component or mating part. The mating part can be any feature(s) configured for connection to a service tube. For purposes of illustration, the technology will be described with respect to an aircraft turbine engine. It will be understood, however, that the technology is not so limited and may have general applicability in non-aircraft applications, such as other mobile applications and non-mobile industrial, commercial, and residential applications, including power generation. Furthermore, even though the following description and accompanying drawings specifically refer to an Auxiliary Power Unit (APU) as an example, it is understood that aspects of the present disclosure may be equally applicable to a wide variety of engines including all types of gas turbine (e.g., continuous combustion) engines, internal (e.g., intermittent) combustion engines, electric powerplants and hybrid powerplants to name a few. It should be further understood that while a particular embodiment is described in reference to a service tube within a strut of a turbine exhaust case, the features of the exemplified service tube assembly could be applied to other service tube assemblies within the engine or along the engine case.

The term "service tube" is herein intended to encompass any tube that can be used in an engine to route a fluid, such as air, oil, air/oil mixture, etc. to an engine component.

The terms "attached", "coupled", "joined", "connected" or "engaged" may include both direct attachment, coupling, joint, connection or engagement (in which two components contact each other) and indirect attachment, coupling, joint, connection or engagement (in which at least one additional component is located between the two components).

The terms "substantially" and "generally" as used herein may be applied to modify any quantitative representation which could permissibly vary without resulting in a change in the basic function to which it is related.

Aspects of various embodiments will now be described through reference to the drawings.

Figure 1:
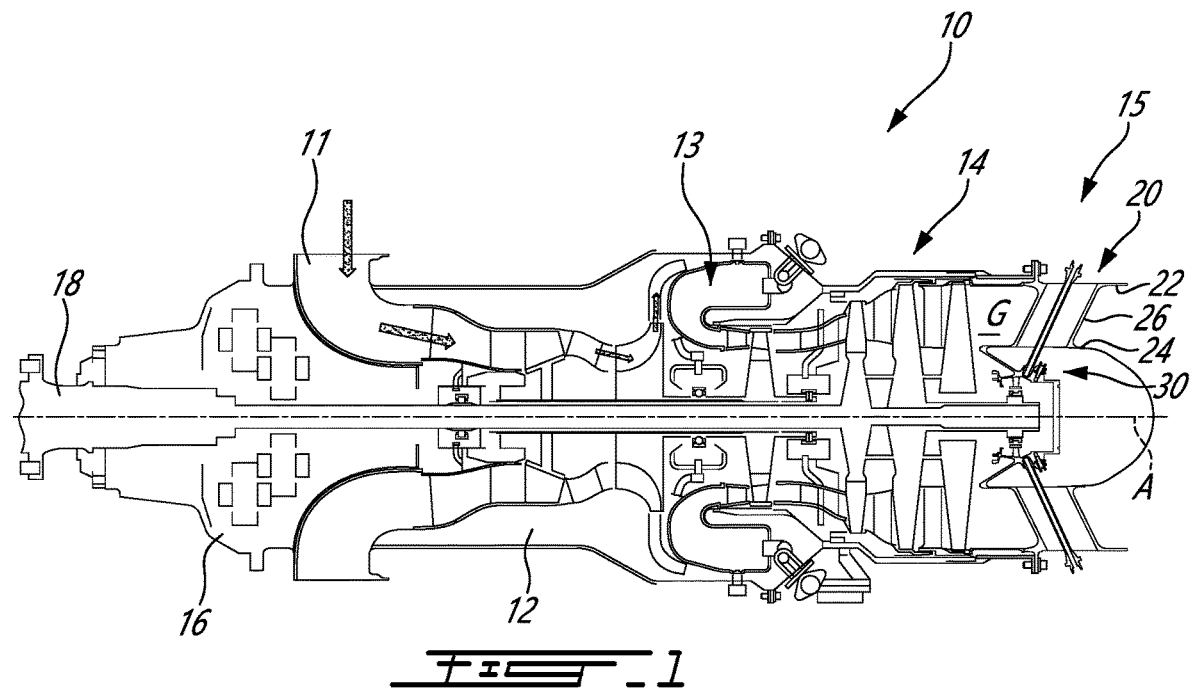
FIG. 1 is a schematic cross-section view of a turbine engine.

FIG. 1 illustrates a turbine engine 10 suitable for use as an APU and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. According to the illustrated exemplary engine, the turbine 14 is drivingly connected to an input end of a reduction gearbox (RGB) 16. The RGB 16 has an output end drivingly connected to an output shaft 18 configured to drive a rotatable load, such as a generator (not shown).

Figure 2:
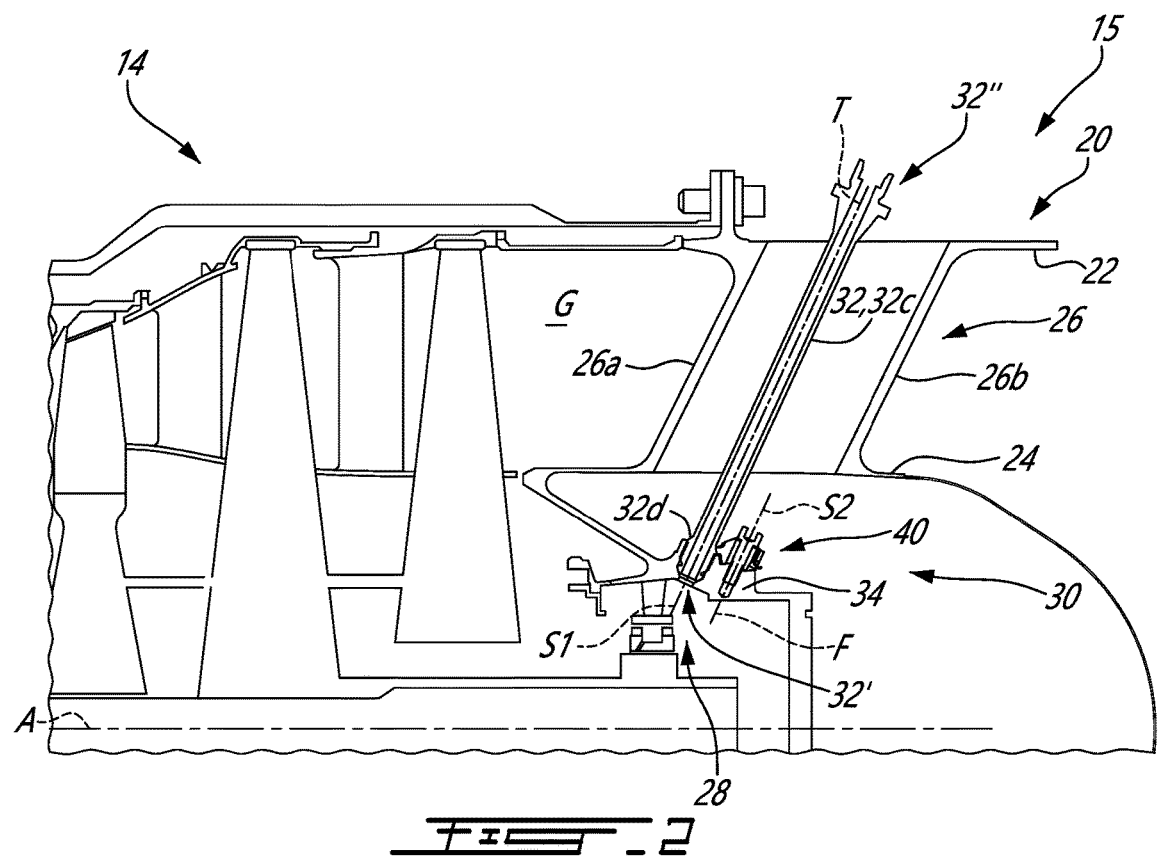
FIG. 2 is a schematic cross-section view of a turbine exhaust case of the engine shown in FIG. 1 including a service tube assembly according to an embodiment.

Turning to FIG. 2, it can be seen that the exhaust 15 comprises a turbine exhaust case 20 having an outer duct wall 22 and an inner duct wall 24 defining therebetween an annular gas path G extending about an engine axis A. The exhaust case 20 further comprises a plurality of struts 26 circumferentially interspaced from one another relative to the axis A. The struts 26 extend generally radially across the annular gas path G from the outer duct wall 22 to the inner duct wall 24, thereby structurally interconnecting the outer and inner duct walls 22, 24. The struts 26 can have an airfoil profile for directing the exhaust gases received from the turbine 14. The struts can thus have a leading edge 26a and a trailing edge 26b. A service tube assembly 30 can be disposed, at least in part, in a hollow interior of one or more of the struts 26 for feeding a service fluid, such as air, oil or an oil/air medium, to an engine component disposed radially inward of the gas path G. According to the illustrated embodiment, the service tube assembly 30 is used to provide oil to a bearing 28 mounted inside the exhaust case 15 for supporting an aft end of a main rotor of the engine 10 (e.g. the aft end of a low pressure spool).

Figure 10A:
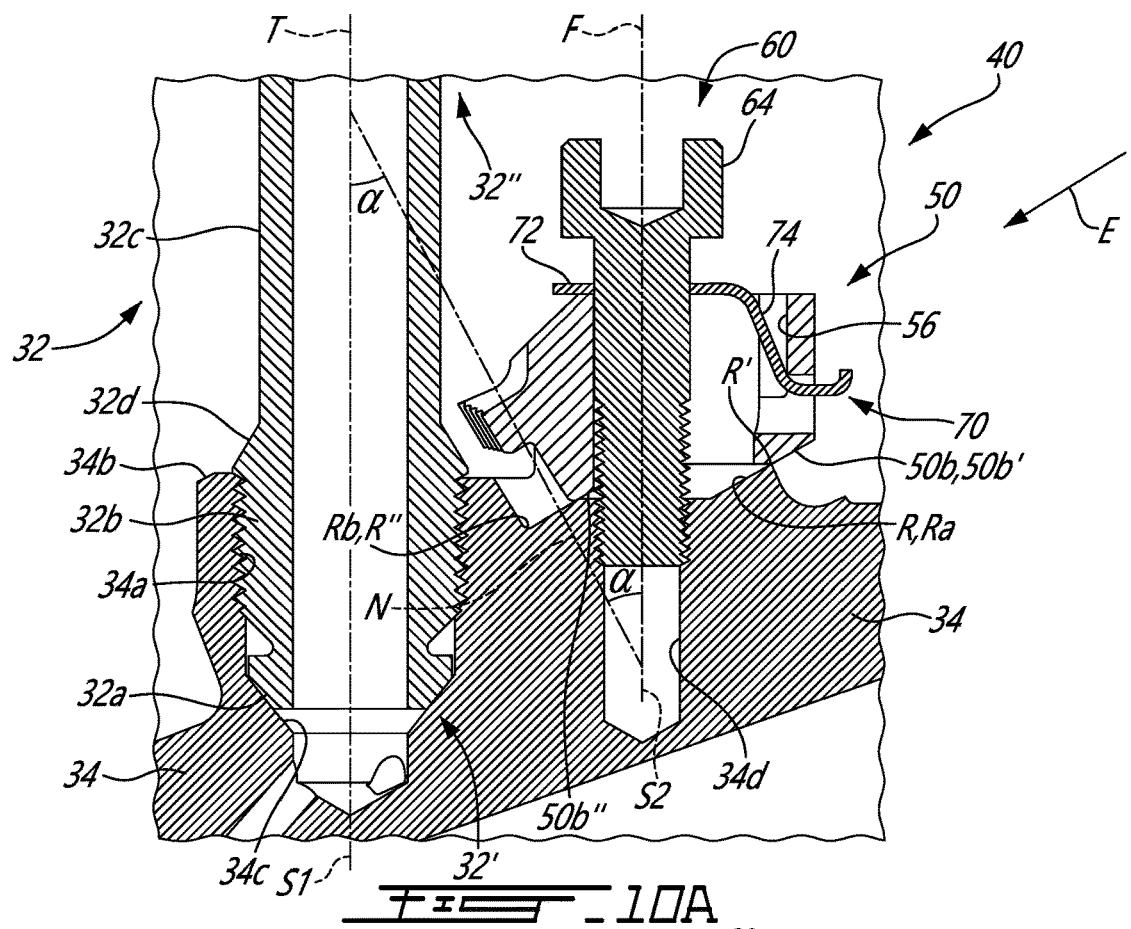
FIGS. 10A and 10B are cross-section views of the service tube assembly, respectively showing the locking assembly in a first position and a second position relative to the mating part.

Referring jointly to FIGS. 2 to 4 and 10A, it can be appreciated that the service tube assembly 30 generally comprises a service tube 32, a mating part 34, herein provided in the form of a housing supporting the bearing 28, and a locking assembly 40 for locking the service tube 32 in place relative to the mating part 34. As best seen in FIG. 10A, the service tube 32 has a tip 32a and a threaded end portion 32b located proximate to the tip 32a and threadedly engaged in a corresponding threaded bore 34a (hereinafter "tube socket" 34a) that extends about a tube socket axis S1 in an outer surface 34b (also referred to as an outer housing surface) of the mating part 34. The service tube 32 has a shank 32c that extends longitudinally along a tube axis T from a proximal end 32', i.e., an end defining the tip 32a and the threaded end portion 32b and thus configured to be disposed closest to the mating part 34, to a distal end 32" opposite to the proximal end 32'. The distal end 32" is adapted to be operatively connected to a torquing device via which torque can be applied to the service tube 32 to rotate the same about the tube axis T, for example in a direction suitable for threadedly engaging the threaded end portion 32b. The service tube 32 also has an annular tube surface 32d that is defined by the shank 32c at a location spaced from the threaded end portion 32b in a direction away from the tip 32a, yet located closer to the tip 32a than to the distal end 32". In embodiments, the annular tube surface 32d is located between the tip 32a and an axial center of the service tube 32 along the tube axis T, and is closer to the tip 32a than to the axial center, such that the annular tube surface 32d can be said to be part of the proximal end 32'. As will become apparent from the forthcoming description, the only contacts of the service tube 30 radially inward of the distal end 32" relative to the axis A is with the mating part 34 and with the locking assembly 40.

With reference to FIG. 10A, the tube socket 34a with which the threaded end portion 32b is engaged may be a threaded bore machined in the mating part 34 or a straight-walled bore provided with a suitable threaded insert. The service tube 32 is tightened to a predetermined torque to compress the tip 32a in sealing engagement with a corresponding sealing surface 34c circumscribing an inner end portion of the tube socket 34a in the mating part 34. In certain implementations, a seal may be placed between the tip 32a and the sealing surface 34c. Engagement of the threaded end portion 32b with the tube socket 34a causes the tube axis T of the service tube 32 to align with the tube socket axis S1. Over time, such a threaded connection may become loose, which may result in oil leakage at the interface between the service tube 32 and the mating part 34.

It is herein proposed to provide the service tube assembly 30 with the locking assembly 40 as an anti-loosening means to hold the service tube 32 in place relative to the mating part 34 after the same has been threadedly engaged under a specified torque. The locking assembly 40 generally comprises a locking member 50 interfacing between the service tube 32 and the mating part 34 at a location near the threaded engagement therebetween to lock the service tube 32 insofar as rotational loosening relative to the mating part 34 is prevented, and a mechanical fastener 60 provided to limit movement of the locking member 50 relative to the mating part 34. As will be described in further detail hereinbelow, the locking member 50 is provided with surface(s) engageable with the annular tube surface 32d such that rotation of the service tube 32 about the tube socket axis S1 is hindered, for example in a direction opposite to that required for threadedly engaging the threaded end portion 32b and the tube socket 34a. As best seen in FIG. 2, the locking assembly 40 is located proximate to the mating part 34 and in particular radially inward of the inner duct wall 24 of the exhaust case 20 relative to the axis A. By this arrangement, the locking assembly 40 is spaced, and thus thermally-insulated, from annular gas path G and its associated high-temperature conditions, rendering the engaged surfaces of the service tube 32 and of the locking member 50 sufficiently dimensionally stable, which may desirably affect the reliability of their engagement.

Figure 10B:
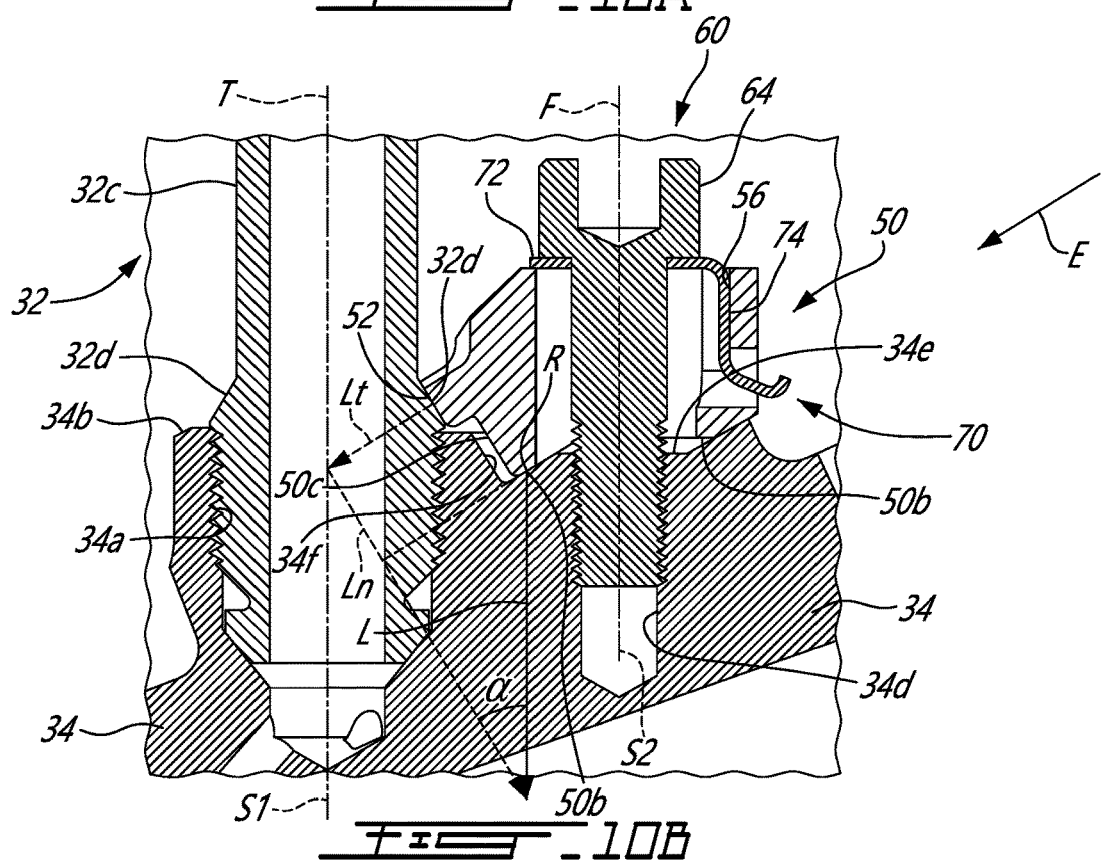

As will be discussed, the mating part 34, the locking member 50 and the fastener 60 are structured and arranged such that the fastener 60 may fasten the locking member 50 to the mating part 34 in such a way that the fastener 60, while being attached to the mating part 34, is movable depthwise between a first fastener position (FIG. 10A) and a second fastener position (FIG. 10B). In this embodiment, the fastener 60 is a bolt that attaches to the mating part 34 by way of threaded engagement with a threaded socket 34d (hereinafter "fastener socket" 34d) defined in the outer housing surface 34b about a fastener socket axis S2. In this embodiment, the fastener socket axis S2 is generally parallel to the tube socket axis S1. The fastener 60 extends deeper in the fastener socket 34d relative to the outer housing surface 34b in the second fastener position than in the first fastener position. In the first fastener position, the locking member 50 is movable relative to the mating part 34 and the fastener 60 between a first member position (FIG. 10A) in which the locking member 50 is spaced away from the service tube 32 and a second member position (FIG. 10B) in which the locking member 50 is in contact with the service tube 32. When the fastener 60 is in the second fastener position, the locking member 50 is held by the fastener 60 in the second member position. It should also be noted that as the fastener 60 is driven into the fastener socket 34d from the first fastener position to the second fastener position, the fastener 60 cooperates with the mating part 34 to force the locking member 50 from the first member position to the second member position. Exemplary structural features of the service tube assembly 30 governing such kinematics of the locking assembly 40 relative to the mating part 34 will be described hereinbelow.

Depending on the embodiment, the locking assembly 40 of the service tube assembly 30 may also comprise at least one link 70, also referred to as a holder or a bracket, that may hold and/or govern the position of the locking member 50 relative to the fastener 60, for example when the locking assembly 40 is being carried toward the mating part 34 or when the locking assembly is being retrieved from the mating part 34, for instance by a user holding the locking assembly 40 via the fastener 60 using a suitable driver.

Turning to FIG. 5, the locking member 50 will be described in more detail. The locking member 50 has a block-like shape and a robust construction suitable for withstanding engagement loads L (FIG. 10 B) applied via the fastener 60 as the fastener 60 is driven in the fastener socket 34*d* against the locking member 50. Yet, the locking member 50 may be constructed of a material having a hardness that is less than that of the service tube 32 and/or of the mating part 34, such that wear of such structure(s) at interface(s) thereof with the locking member 50 occurs mostly on the locking member 50. The locking member 50 has a top surface 50*a*, a bottom surface 50*b* generally opposite the top surface 50*a* and spaced therefrom so as to define a depth of the locking member 50, a periphery extending depthwise from the top surface 50*a* to the bottom surface 50*b*, in this case including a front surface 50*c* (i.e., a surface facing generally toward the tube socket axis S1 and the tube axis T when the locking member 50 is installed on the mating part 34), a rear surface 50*d* and a pair of side surfaces 50*e* extending lengthwise from the front surface 50*c* to the rear surface 50*d* opposite one another. The periphery, in this case the front surface 50*c*, defines an engagement member surface 52 suitable for engaging the service tube 32 via its annular tube surface 32*d*. In embodiments, the engagement member surface 52 has a shape complementary to that of the annular tube surface 32*d*. For example, the engagement tube surface 52 may extend circumferentially relative to the tube axis T so as to follow a contour of the annular tube surface 32*d*. Depending on the embodiment, one or more of the engagement member surface 52 and the annular tube surface 32*d* may be provided with surface discontinuities, for example knurling, that may contribute to define a suitable coefficient of friction at the interface between the engagement member surface 52 and the annular tube surface 32*d*. For similar purposes, one or more of the engagement member surface 52 and the annular tube surface 32*d* may define teeth 52*a* disposed circumferentially relative to the tube axis T. Other complementary shapes are contemplated for the engagement member surface 52 and the annular tube surface 32*d*. For example, the annular tube surface 32*d* may be a groove extending radially into the shank 32*c*, and the engagement member surface 52 may be a projection that is matingly received in the groove upon the locking member 50 being in the second member position. Conversely, the annular tube surface 32*d* may be an annular ridge projecting radially from the shank 32*c*, and the engagement member surface 52 may define a groove inside which the annular ridge is matingly received upon the locking member 50 being in the second member position.

Still referring to FIG. 5, the locking member 50 is structured and arranged relative to the fastener 60 such that as the fastener 60 is driven from the first fastener position to the second fastener position, the fastener 60 eventually engages the locking member 50 without hindering movement of the locking member 50 toward the second member position. In the illustrated embodiment, this is achieved by the fastener 60 being received inside a slot 54 of the locking member 50 that extends depthwise therethrough, in this case from the top surface 50*a* to the bottom surface 50*b*. The depthwise direction may be generally parallel to the fastener socket axis S2. The slot 54 also extends lengthwise in the locking member 50 toward the engagement member surface 52 from a distal slot end 54*a* to a proximal slot end 54*b*. When the locking member 50 is seated on the mating part 34, the lengthwise direction in which the slot 54 extends may be said to correspond to, or at least be coplanar with, an engagement direction E in which the locking member 50 moves from the first member position to the second member position. The slot 54 may be transversely centered with respect to the side surfaces 50*e*. A shank 62 of the fastener 60 is slidingly received by the slot 54 such that the distal slot end 54*a* and the proximal slot end 54*b* respectively move toward and away from the shank 62 when the locking member 50 moves away from the first member position toward the second member position. In the present embodiment, the locking member 50 has an inner recess 56 defined alongside the slot 54 at the distal slot end 54*a*.

The bottom member surface 50*b* of the locking member 50 is shaped so as to form a gliding joint with a corresponding portion of the outer housing surface 34*b* referred to as a ramp R. In this embodiment, the bottom member surface 50*b* includes a distal bottom surface 50*b*' and a proximal bottom surface 50*b*" respectively located near the distal slot end 54*a* and the proximal slot end 54*b*. Both bottom surfaces 50*b*', 50*b*" are in this case parallel planar surfaces extending parallel to the engagement axis E, although other shapes are contemplated.

The locking member 50 is also arranged so as to form a prismatic joint with a corresponding portion of the link 70. For example, the locking member 50 may be provided with track-like shape(s) such as outer recesses 58 defined by the periphery, for example one outer recess 58 defined by each side surface 50*e*. In this case, each outer recess 58 is spaced depthwise relative to the top surface 50*a*. In other embodiments, the track-like shape may be provided elsewhere on the locking member 50, such as on the top surface 50*a* for example.

The locking assembly 40 may comprise a spring, which may be a part of the link 70, that is operatively connected between the fastener 60 and the locking member 50 to bias the fastener 60 toward a proximal fastener position away from the distal slot end 54*a*. Such a spring may for example be disposed inside the slot 54, and may extend from inside the inner recess 56. The fastener 60 is slidable in opposition to the spring toward the distal slot end 54*a* from the proximal fastener position to a distal fastener position. For example, FIG. 6 shows an embodiment of the link 70 in which the link 70 may be said to be spring-loaded. The link 70 includes a washer 72 receiving the shank 62 of the fastener 60 and spring-like arm 74 extending from a first arm end 74*a* joined to the washer 72 and a second arm end 74*b* held by the locking member 50. The washer 72 may have a body defining an opening 72*a* that is sized large enough for receiving the shank 62 of the fastener 60 yet small enough so as to hinder passage of a head 64 of the fastener 60 therethrough. In some embodiments, a radially inner wall of the washer 72 may be threaded so as to threadedly engage the shank 62 of the fastener 60. In this embodiment, the body of the washer 72 has a tab 72b projecting radially into the opening 72a for threadedly engaging the shank 62. A perimeter of the body of the washer 72 surrounding the opening 72a is sized wide enough so as to overhang the top surface 50a of the body 50 upon the opening 72 aligning with the slot 54. The link 70 may also have clip(s) 76, i.e., a means for releasably latching onto the locking member 50. For example, the link 70 may have a pair of clips 76 extending depthwise on either side of the washer 72 from a first end 76a joined to the washer 72 to a second, opposite end 76b having a shape suitable for engaging with a corresponding one of the track-like shaped outer recesses 58 so as to be slidable in the engagement direction E. The washer 72 may thus be said to be slidably engaged with the locking member 50. In some embodiments, the washer 72 and the clip(s) 76 are omitted, and the link 70 consists of a spring or any suitable spring-like resilient structure.

In FIGS. 7 and 10A, the link 70 is shown in a first link position, in this case corresponding to an undeformed, uncompressed or undeflected state, in which the arm 74 extends across the recess 56 from its first arm end 74a to its second arm end 74b located on either side of the recess 56. In this embodiment, the first arm end 74a is held in a cavity 56a of the locking member 50 extending from the recess 56 away from the slot 54, provided in this case in the form of a passage extending from the recess 56 to the rear surface 50d. When the fastener 60 extends through the opening 72a of the washer 72 and the link 70 is in the first link position, the fastener 60 is held by the washer 72 in the proximal fastener position relative to the locking member 50. In FIG. 10B, the link 70 is shown in a second link position, corresponding to a deformed, compressed or deflected state, in which the arm 74 may be mostly housed in the inner recess 56. In other embodiments, when the link 70 is the first link position, the arm 74 is deformed, compressed or deflected, albeit less so than in the second link position. When the fastener 60 extends through the opening 72a of the washer 72 and the link 70 is in the second link position, the fastener 60 is held by the washer 72 in the distal fastener position relative to the locking member 50. As the link 70 moves from the first link position to the second link position, the sliding engagement of the link 70 with the locking member 50 (in this case provided by the outer recesses 58 and the clips 76) may assist in maintaining the fastener 60 in alignment with the slot 54.

Figure 8:
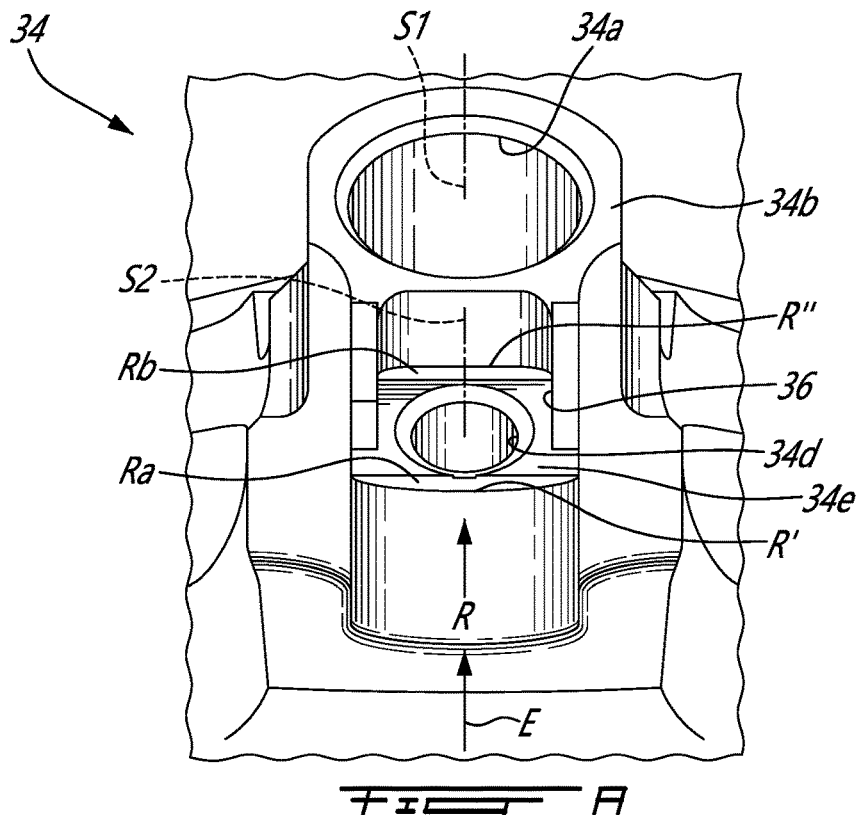
FIG. 8 is a perspective view of a mating part of the service tube assembly of FIG. 3.
Figure 9:
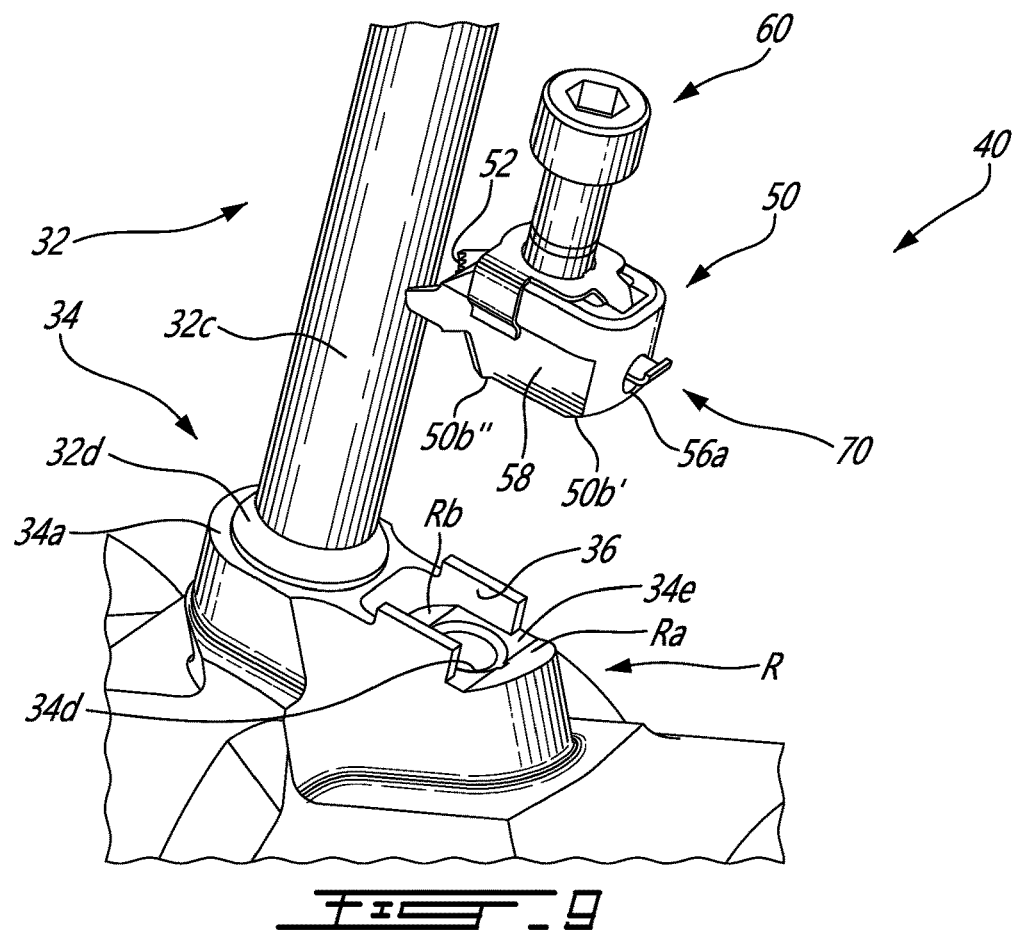
FIG. 9 is a perspective view of the service tube assembly, with the locking assembly shown removed from the mating part.

Referring to FIGS. 8 and 9, characteristics of the mating part 34 will be discussed. As mentioned hereinabove, the outer surface 34b of the mating part 34 defines a ramp R, via which the bottom surface 50b of the locking member 50 engages the mating part 34. The ramp R extends from a distal ramp end R' to a proximal ramp end R" spaced from one another in the engagement direction E. The tube socket axis S1 is spaced from the proximal ramp end R" in the engagement direction E. In some embodiments, a normal direction N of the ramp R extends toward the tube socket axis S1 at an acute angle $\alpha$. As such, the ramp R may be said to be inclined toward the tube socket 34a. Stated otherwise, the ramp R may be said to extend toward the tube socket 34a so as to define the engagement direction E, such that the engagement direction is at an acute angle relative to the tube socket axis S1 that is complementary to the acute angle $\alpha$. In the depicted embodiment, the normal direction N of the ramp R defines the same acute angle $\alpha$ with respect to the fastener socket axis S2, i.e., the tube socket axis S1 and the fastener socket axis S2 are parallel. Hence, the engagement load L may be decoupled according to the acute angle $\alpha$ as a normal load (or component) Ln perpendicular to the ramp R and a tangential load (or component) Lt parallel to the ramp R. Other arrangements of the ramp R with respect to the tube socket and fastener socket axes S1, S2 are possible depending on the embodiment. It should be noted that the ramp R in this case consists in a distal ramp surface Ra having the distal ramp end R' and a proximal surface portion Rb having the proximal ramp end R". The distal and proximal ramp surfaces Ra, Rb are spaced from one another in the engagement direction E. A portion 34e of the outer housing surface 34b into which the fastener socket 34d extends forms a discontinuity in the ramp R. The portion 34e in this case is a planar surface located between the distal and proximal ramp surfaces Ra, Rb. Hence, the fastener socket 34d is located between the distal ramp surface Ra and the proximal ramp surface Rb. The distal and proximal ramp surfaces Ra, Rb may be spaced from one another in a direction perpendicular to the engagement direction E, for example the normal direction N. Other configurations for the ramp R are contemplated. For example, in embodiments, the ramp R may include ramp surfaces spaced from one another on either side of the fastener socket 34d in a direction that lays in a plane that is coplanar to the ramp R. In embodiments, the ramp R may circumscribe the fastener socket 34d. The mating part 34 and the locking member 50 may define complementary anti-rotational features that are cooperable to hinder rotation of the locking member 50 about the tube socket axis S1. For example, the mating part 34 may have walls 36 spaced from one another in a direction orthogonal to the engagement and normal directions E, N, on either side of the ramp R. Such walls 36 may engage with the periphery of the locking member 50, namely with the outer recesses 58. Advantageously, the engagement of the walls 36 with the outer recesses 58 does not hinder displacement of the locking member 50 from the first member position to the second member position, and may even be said to guide such displacement.

In FIG. 10A, the locking assembly 40 is shown in a first assembly position relative to the mating part 34 and to the service tube 32. In the first assembly position, the locking member 50 is in the first member position, and the bottom surface 50b thereof lays against the ramp R. The fastener 60 is in the proximate fastener position with respect to the locking member 50 and the head 64 of the fastener 60 has yet to engage the locking member 50, as the case is when in the first fastener position relative to the mating part 34. The link 70 is in the first link position, biasing the locking member 50 away from the second member position and toward the first member position. In the first assembly position, the engagement member surface 52 is spaced away from the service tube 32 by a radial clearance relative to the tube socket axis S1. In some embodiments, the radial clearance is sufficient for the service tube 32 to be installed in and/or removed from the tube socket 34a unhindered by the locking assembly 40. In FIG. 10B, the locking assembly 40 is shown in a second assembly position. In the second assembly position, the locking member 50 is in the second member position and engages the service tube 32. The fastener 60 is in the proximate fastener position with respect to the locking member 50 and in the second fastener position relative to the mating part 34, engaging the locking member 50 (in this case indirectly via the link 70). The link 70 is in the second link position. The fastener 60 may be said to be cooperable with the locking member 50 and the ramp R to move the locking member 50 in the second member position upon the fastener 60 being seated against the locking member 50, whether directly or indirectly. As shown in FIGS. 10A and 10B, the bottom surface 50b of the locking member 50 contacts the ramp R whether the locking member 50 is in the first member position or the second member position. Namely, in this case, the distal bottom surface 50b' and the proximal bottom surface 50b" respectively remain in contact with the distal ramp portion Ra and the proximal ramp portion Rb so long as the locking member 50 is in a position between the first and the second member position relative to the mating part 34. It should be noted that the locking member 50 contacts the mating part 34 solely via the ramp R when the locking member 50 is either in the first member position or in the second member position. For instance, when the locking member 50 is in the second member position (FIG. 10B), there is a gap between the portion 34e of the outer housing surface 34 and an opposite portion of the bottom surface 50b. Moreover, depending on the embodiment, should there be a portion 34f of the outer housing surface 34b extending between the ramp R and the tube socket 34a, a gap is also present between the front surface 50c and this portion 34f. By this arrangement, upon the locking member 50 being in the second member position and engaging the annular tube surface 32d of the service tube 32 via the engagement member surface 52, the tangential component Lt of the engagement load L is generally entirely applied to and borne by the service tube 32.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, it is contemplated that the locking assembly 40 may be provided with a wedge-like structure driven by the fastener 60 between the locking member 50 and a suitable wall of the mating part 34 so as to progressively move the locking member 50 toward the service tube 32 until engagement therebetween is achieved. In some such embodiments, the ramp R may extend at an acute angle, perpendicularly or at an obtuse angle relative to the tube socket axis S1. Yet further modifications could be implemented by a person of ordinary skill in the art in view of the present disclosure, which modifications would be within the scope of the present technology.

The invention claimed is:

1. A service tube assembly for an aircraft engine, comprising:
a service tube having a threaded end portion, an opposed end portion and an annular tube surface proximate to the threaded end portion;
a housing having an outer housing surface defining a tube socket extending in the outer housing surface, and a ramp extending toward the tube socket so as to define an engagement direction, the tube socket threadably engaged with the threaded end portion of the service tube;
a locking member having a bottom member surface disposed against the ramp and an engagement member surface facing toward the service tube, the locking member slidable along the ramp in the engagement direction between a first member position in which the engagement member surface is spaced from the annular tube surface and a second member position in which the engagement member surface contacts the annular tube surface; and
a mechanical fastener releasably holding the locking member against the ramp.

2. The service tube assembly of claim 1, wherein the tube socket extends about a tube socket axis, the engagement direction being at an acute angle relative to the tube socket axis.

3. The service tube assembly of claim 1, wherein the housing has a fastener socket extending in the outer housing surface about a fastener socket axis located between a distal ramp end and a proximal ramp end of the ramp, the mechanical fastener threadedly engaged with the fastener socket to releasably hold the locking member against the ramp.

4. The service tube assembly of claim 3, wherein the ramp includes a distal ramp surface having the distal ramp end, a proximal ramp surface having the proximal ramp end, the distal ramp surface and the proximal ramp surface spaced from one another in the engagement direction, the fastener socket located between the distal ramp surface and the proximal ramp surface.

5. The service tube assembly of claim 4, wherein the distal ramp surface and the proximal ramp surface are spaced from one another in a direction perpendicular to the engagement direction.

6. The service tube assembly of claim 4, wherein the bottom member surface includes a distal bottom surface disposed against the distal ramp surface and a proximal bottom surface disposed against the proximal ramp surface.

7. The service tube assembly of claim 6, wherein at least one of the distal bottom surface and the proximal bottom surface is planar.

8. The service tube assembly of claim 1, wherein the engagement member surface has a shape complementary to that of the annular tube surface.

9. The service tube assembly of claim 8, wherein the tube socket extends about a tube socket axis, and the engagement member surface extends circumferentially relative to the tube socket axis so as to follow a contour of the annular tube surface.

10. The service tube assembly of claim 9, wherein one or more of the engagement member surface and the annular tube surface defines teeth disposed circumferentially relative to the tube socket axis.

11. The service tube assembly of claim 1, wherein the locking member has a slot extending depthwise through the locking member to the bottom member surface, the slot extending lengthwise toward the engagement member surface from a distal slot end to a proximate slot end, the mechanical fastener slidingly received by the slot such that the distal slot end and the proximal slot end respectively move toward and away from the mechanical fastener when the locking member moves away from the first member position toward the second member position.

12. The service tube assembly of claim 11, further comprising a spring operatively connected between the mechanical fastener and the locking member to bias the mechanical fastener toward a proximal fastener position away from the distal slot end, the mechanical fastener slidable toward the distal slot end from the proximal fastener position to a distal fastener position.

13. The service tube assembly of claim 12, wherein the spring includes a washer receiving the mechanical fastener and an arm extending from a first arm end joined to the washer to a second arm end held by the locking member.

14. The service tube assembly of claim 13, wherein the locking member defines a recess in the distal slot end, at least the second arm end received inside the recess.

15. The service tube assembly of claim 2, wherein the housing and the locking member have complementary anti-rotational features cooperable to hinder rotation of the locking member about the tube socket axis.

16. A turbine exhaust case comprising:
an outer duct wall and an inner duct wall defining therebetween an annular gas path about an engine axis;
a strut extending across the annular gas path;
a service tube extending through the strut, the service tube having a threaded end portion and an annular tube surface spaced from the threaded end portion;
a housing disposed radially inwardly from the inner duct wall, the housing having a tube socket, the threaded end portion of the service tube threadably engaged with the tube socket, the housing further having a ramp located next to the tube socket;
a locking assembly including a locking member and a mechanical fastener slidably received by the locking member, the locking member fastenable to the housing via the mechanical fastener, the locking member slidable along the ramp upon being fastened to the housing from a first member position spaced from the annular tube surface to a second member position against the annular tube surface.

17. The turbine exhaust case of claim 16, wherein the mechanical fastener is cooperable with the locking member and the ramp to move the locking member in the second member position upon the mechanical fastener being seated against the locking member.

18. The turbine exhaust case of claim 16, wherein the locking assembly includes a spring structured and arranged to bias the locking member away from the second member position and toward the first member position.

19. The turbine exhaust case of claim 18, wherein the spring includes a washer threadedly engaged with the mechanical fastener and an arm extending from a first arm end joined to the washer to a second arm end held by the locking member, the arm reversibly deflecting upon the locking member moving from the first member position toward the second member position.

20. The turbine exhaust case of claim 19, wherein the washer is slidably engaged with the locking member.

* * * * *